US00H002113H

(19) United States

(12) Statutory Invention Registration

Nichols et al.

(10) Reg. No.: US H2113 H

(43) Published: Jan. 4, 2005

(54) INK COMPOSITIONS

(75) Inventors: Garland J. Nichols, Ontario, NY (US); Chieh-Min Cheng, Rochester, NY (US); Min-Hong Fu, Webster, NY (US); Elizabeth A. Kneisel, Rochester, NY (US)

(73) Assignee: Xerox Corporation, Stamford, NY (US)

(21) Appl. No.: 09/375,031

(22) Filed: Aug. 16, 1999

(51) Int. Cl.[7] ..... C03C 17/00

(52) U.S. Cl. ..... 523/160; 524/590; 524/840

(58) Field of Search ..... 523/160, 161; 106/31.27, 31.28, 31.6; 524/590, 591, 839, 840

(56) References Cited

U.S. PATENT DOCUMENTS

| | | | | | |
|---|---|---|---|---|---|
| 4,463,359 | A | | 7/1984 | Ayata et al. | 346/1.1 |
| 4,471,079 | A | * | 9/1984 | Enami | 523/161 |
| 4,812,492 | A | * | 3/1989 | Eckes et al. | 523/351 |
| 4,820,346 | A | * | 4/1989 | Nowak | 564/169 |
| 4,840,674 | A | | 6/1989 | Schwarz | 106/22 |
| 4,853,036 | A | | 8/1989 | Koike et al. | 106/20 |
| 5,021,802 | A | | 6/1991 | Allred | 346/1.1 |
| 5,041,161 | A | | 8/1991 | Cooke et al. | 106/22 |
| 5,043,084 | A | | 8/1991 | Gutierrez et al. | 252/47 |
| 5,065,167 | A | | 11/1991 | You et al. | 346/1.1 |
| 5,124,718 | A | | 6/1992 | Koike et al. | 346/1.1 |
| 5,278,020 | A | | 1/1994 | Grushkin et al. | 430/137 |
| 5,290,654 | A | | 3/1994 | Sacripante et al. | 430/137 |
| 5,308,734 | A | | 5/1994 | Sacripante et al. | 430/137 |
| 5,336,711 | A | * | 8/1994 | Schneider et al. | 524/507 |
| 5,344,738 | A | | 9/1994 | Kmiecik-Lawrynowicz et al. | 430/137 |
| 5,370,963 | A | | 12/1994 | Patel et al. | 430/137 |
| 5,385,957 | A | * | 1/1995 | Tobias et al. | 523/161 |
| 5,539,038 | A | * | 7/1996 | Katsen et al. | 524/399 |
| 5,594,044 | A | * | 1/1997 | Yang | 523/160 |
| 5,656,701 | A | * | 8/1997 | Miyamoto et al. | 524/453 |
| 5,691,425 | A | * | 11/1997 | Klein et al. | 525/455 |
| 5,696,182 | A | * | 12/1997 | Kashiwazaki et al. | 523/161 |
| 5,700,851 | A | * | 12/1997 | Banning et al. | 523/161 |
| 5,710,209 | A | * | 1/1998 | Blum et al. | 524/591 |
| 5,736,606 | A | * | 4/1998 | Yanagi et al. | 524/547 |
| 5,762,695 | A | * | 6/1998 | Wong et al. | 106/31.89 |
| 5,830,927 | A | * | 11/1998 | Vanderhoff et al. | 522/81 |
| 5,880,209 | A | * | 3/1999 | Patzschke et al. | 524/591 |
| 5,886,082 | A | * | 3/1999 | Numa et al. | 524/501 |
| 5,955,515 | A | * | 9/1999 | Kimura et al. | 523/161 |
| 5,965,196 | A | * | 10/1999 | Sawada | 427/161 |
| 6,022,910 | A | * | 2/2000 | Nishizaki et al. | 523/161 |
| 6,034,154 | A | * | 3/2000 | Kase et al. | 523/161 |

FOREIGN PATENT DOCUMENTS

| | | | |
|---|---|---|---|
| GB | 2105735 | * | 9/1981 |

* cited by examiner

*Primary Examiner*—Michael J. Carone

(74) *Attorney, Agent, or Firm*—Eugene O. Palazzo

(57) ABSTRACT

A process for the preparation of an ink which comprises mixing an ink vehicle, a colorant and a polyurethane resin emulsion.

41 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INK COMPOSITIONS

PENDING APPLICATIONS AND PATENTS

Disclosed in U.S. Pat. No. 5,837,043 and U.S. Pat. No. 5,762,695 the disclosures of each patent being totally incorporated herein by reference in their entirety, are inks with certain surfactants. More specifically, in U.S. Pat. No. 5,762,695, there is disclosed an ink jet ink and imaging process which comprises the development of an image with an aqueous ink jet ink composition comprised of colorant, water, and a polyhydroxy alcohol surfactant present in an amount of from about 2 to about 10 weight percent.

The following patents, the disclosures of each being totally incorporated herein by reference relate to ink jet inks:

U.S. Pat. No. 5,973,026 relating to an aqueous ink containing a dissipatible polymer, colorant and a zwitterionic component like betaine;

U.S. Pat. No. 5,977,209 relating to an ink containing a colorant, polymer, such as a dissipatible polymer, vehicle, and a salt of polyacrylic, a salt of polyamic acid, a salt of alginic acid, or mixtures thereof;

U.S. Pat. No. 5,969,003 relating to an ink containing a resin of a dissipatible sulfonated polyester terminated with acrylic or methacrylic acid groups; and U.S. Pat. No. 5,938,827 relating to an ink containing a mixture of two black colorants, betaine, and N,N'-bis(3-aminopropyl) ethylenediamine.

Emulsion/aggregation/coalescence processes for the preparation of dry toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935.

The appropriate components and processes of the above applications and patents may be selected for the present invention in embodiments thereof.

BACKGROUND OF THE INVENTION

The present invention is generally directed to ink compositions, and processes thereof, and more specifically, the present invention is directed to processes for the preparation of colored aqueous ink compositions particularly suitable for use in ink jet printing processes, and especially thermal ink- jet processes, and other similar processes, and wherein there is permitted minimal or no koagation, inks with suitable particle sizes, reduced smear for the images developed, resistance to solvents, abrasion, and scratching, toughness, minimal intercolor bleed for the images developed, and wherein paper curl is minimized and image smearing is minimal, or avoided. The inks in-embodiments of the present invention are comprised of an ink vehicle, colorant, and additives, and wherein the inks can be prepared by blending a polyurethane resin emulsion comprised for example of from about 17 to about 60 percent by weight of a polyurethane resin, from about 0.1 to about 3 percent by weight of a surfactant, and from about 33 to about 82 percent by weight of water and a colorant dispersion, and isolating the ink, and wherein the latex can be prepared by emulsion polymerization. Particularly useful as the latex resin are known waterborne polyurethane dispersions, which resins or polymers are commercially available from Bayer Chemical or King Industries, and which can be prepared by polymerizing a polyurethane in a solvent followed by dispersing the mixture resulting in water, or wherein an isocyanate terminated prepolymer can be prepared in the melt or in an aprotic solvent, and subsequently chain extended with a diamine in the water phase in the presence of a neutralizing tertiary amine.

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and in the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink remaining in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084, the disclosures of which are totally incorporated herein by reference.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some systems, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the ability of the ink to be stable with minimal or no settling, the ability of the ink to remain in a fluid condition in a printhead opening on exposure to air, and moreover wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, is capable of firing a drop of ink at its intended target. Latency is the maximum idling times allowed for ink to be jetted by a printer with a speed equal to or greater than 5 m/s (equivalent to an ink traveling a distance of 0.5 millimeters in less than 100 $\mu$s) without a failure. This measurement can be accomplished with the printhead or nozzles uncovered or decapped and generally at a relative humidity of about 15 percent. The time interval is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain stable throughout the life of the ink jet cartridge. Dye-based ink jet inks suffer from deficiencies in waterfastness and lightfastness after being printed on various substrates. Pigments provide an image on a wide variety of substrates, having high optical density with high waterfastness and lightfastness. Therefore, pigments are a preferred alternative to dyes, provided the pigment dispersions can be made stable to prevent flocculation and/or aggregation and settling. Some cosolvents that can be selected as clogging inhibitors cause destabilization of pigment dispersions and, therefore, are not usually effective in pigmented inks.

There is thus a need for aqueous ink compositions and processes thereof that can be utilized in high resolution ink jet printers. Additionally, there is a need for colored, especially pigmented inks that provide high latency and also remain stable throughout the life of the ink jet cartridge. There is also a need for pigmented inks that provide high optical density in a single pass. More importantly, there is a need for ink jet inks wherein paper curl, and/or image smearing can be eliminated or minimized when such inks are selected for ink jet printing processes, and wherein the images possess minimal, or acceptable intercolor bleed, that is for example, wherein color overlap, or diffusing of one color into another is minimal, or avoided; and wherein excellent waterfastness and lightfastness images can be generated. Another need resides in the inks and processes thereof containing polyurethane resin emulsions enabling inks with smear resistance, especially when such inks contain surface treated carbon black colorants, and optical density enhancements, or wherein the ink can contain condensation generated resins of polymers of phenoplasts, aminoplasts, alkyds, polyesters, polyamides, polyurethanes, and epoxide resins or polymers.

SUMMARY OF THE INVENTION

Aspects of the present invention relate to a process for the preparation of an ink which comprises mixing an ink vehicle, a colorant and a polyurethane resin emulsion; a process wherein the polyurethane resin emulsion is generated from the urethanization of (a) from about 50 to about 95 weight percent of a polyester polyol; and (b) from about 5 to about 45 weight percent of a polyisocyanate; and (c) from about 1 to about 15 weight percent of ionic groups and wherein the total of said components (a) to (c) is about 100 percent; a process wherein the polyester polyol is generated by the polycondensation of from about 0 to about 80 weight percent of a monocarboxylic acid, from about 5 to about 60 weight percent of a polycarboxylic acid, and from about 10 to about 80 weight percent of a polyol; a process wherein the polyurethane resin emulsion particles possesses a particle size of from about 0.05 microns to about 1 microns, or from about 0.1 microns to about 0.5 microns in volume average diameter; a process wherein the polyurethane resin emulsion possesses a viscosity at 25° C. of from about 10 to about 20,000 centipoise (cPs), and or from about 50 to about 10,000 centipoise; a process wherein the polyurethane resin possesses a weight average molecular weight Mw of from about 1,500 to about 100,000, or from about 2,000 to about 45,000; a process wherein the polyurethane resin possesses a number average molecular weight Mn of from about 1,000 to about 70,000, or from about 1,000 to about 30,000; a process wherein the polyurethane resin emulsion possesses a hydroxyl number of from about 10 to about 300, or from about 20 to about 150 mg KOH/g; a process wherein the polyurethane resin possesses a carboxyl group content corresponding to an acid number of from about 5 to about 70, or from about 10 to about 40 mg KOH/g; a process wherein the polyurethane resin emulsion possesses urethane groups calculated as NH-O-O-, molecular weight, Mw of 59, of from about 2 to about 20, and or from about 5 to about 15 weight percent; a process wherein (a) is prepared by the polycondensation of from about 0 to about 80 weight percent of a monocarboxylic acid, from about 5 to about 60 weight percent of a polycarboxylic acid, and from about 10 to about 80 weight percent of a polyol, wherein said monocarboxylic acid is benzoic acid, tert-butylbenzoic acid, hexahydrobenzoic acid, saturated fatty acids of 2-ethylhexanoic acid, isononanoic acid, decanoic acid, dodecanoic acid, and stearic acid, unsaturated fatty acids such of soybean oil fatty acid, soya oil fatty acid, sorbic acid, and conjugated diene fatty acid, or mixtures thereof; wherein the polycarboxylic acid is di-, tri-, and/or tetracarboxylic acids of phthalic acid, isophthalic acid, terephthalic acid, tetrahydrophthalic acid, maleic acid, succinic acid, fumaric acid, adipic acid, sebacic acid, phthalic anhydride, tetrahydrophthalic anhydride, hexahydrophthalic anhydride, maleic anhydride, succinic anhydride, or mixtures thereof, and wherein the polyol is ethylene glycol, propylene glycol, butanediol, 1,6-hexanediol, diethylene glycol, triethylene glycol, neopentyl glycol, pentaerythriol, trimethylpentanediol, or mixture thereof; the polyisocyanate (b) is 1-methyl-2,4-diisocyanato-cyclohexane, 1-methyl-2,6-diisocyanato-cyclohexane, 1,6-hexamethylene diisocyahate (HDI), 1 -isocyanato-3,3,5-trimethyl-5-isocyanatomethyl-cyclohexane (IPDI), 2,4- or 2,6-diisocyanato-toluene (TDI), 4,4'-diisocyanatodicyclohexylmethane ($Hl_2MDI$), or 4,4'-diisocyanatodiphenyl-methane (MDI); and wherein (c) is obtained from 2,2-bis(hydroxymethyl)-alkanecarboxylic acids of dimethylolacetic acid, 2,2-dimethylolpropionic acid, 2,2-dimethylolbutyfic acid, and 2,2-dimethylolpentanoic acid), dihydroxysuccinic acid, hydroxypivalic acid, and mixtures thereof; a process wherein the monocarboxylic acid selected for generation of the polyester polyol (a) are tert-butylbenzoic acid, stearic acid, or soybean oil fatty acid; wherein the polycarboxylic acids selected for the generation of the polyester polyol (a) is isophthalic acid, phthalic anhydride, or hexahydrophthalic anhydride; or wherein the polyol selected for generation of the polyester polyol (a) is 1,6-hexanediol, neopentyl glycol, pentaerythriol, or trimethylpentanediol; wherein the polyisocyanates (b) are 1 -methyl-2,4-diisocyanato-cyclohexane, 1 -methyl-2,6-diisocyanato-cyclohexane, and 1 -isocyanato-3,3,5-trimethyl-5-isocyanatomethyl-cyclohexane (IPDI); wherein the ionic groups (c) were obtained from acids of 2,2-dimethylolpropionic acid and hydroxypivalic acid; a process wherein the polyurethane resin contained in the polyurethane emulsion is generated from the urethanization of from about 50 to about 95, or from about 65 to about 90 weight percent of a polyester polyol; from about 5 to about 45, or from about 5 to about 30 weight percent of a polyisocyanate; and from about 1 to about 15, or from about 3 to about 10 weight percent of an acid component that will enable incorporation of ionic groups; a process wherein the polyurethane resin emulsion is comprised of from about 17 to about 60 percent by weight of polyurethane resin, from about 0.1 to about 3 percent by weight of surfactant, and from about 33 to about 82 percent by weight of water; a process wherein the polyurethane resin is present in an amount of from about 20 to about 50 weight percent; a process wherein the total of all ink components is about 100 percent; a process wherein the colorant is a dye; a process wherein the colorant is a pigment; a process wherein the polyurethane emulsion contains water; a process wherein there is added to the ink an ink vehicle and ink additives; a process wherein the vehicle is water, a glycol, or a mixture of glycol's, or a mixture of water and a miscible organic component of ethylene glycol, propylene glycol, diethylene glycols, glycerine, dipropylene glycol, polyethylene glycol, or polypropylene glycols; a process utilizing ink additives of surfactants of poly(ethylene glycol) monolaurate, poly (ethylene glycol) monoricinoleate, poly(ethylene glycol) lanolin alcohol ether, poly(ethylene glycol) monooleate, poly(ethylene glycol) castor oil, poly(ethylene glycol) tetramethyl optionally decynediol, or poly(ethylene glycol) lanolin, and which surfactants are present in an amount of from about 0.01 to about 7 weight percent or parts based on the total ink components; a high resolution printing process comprising applying in imagewise fashion to a substrate an ink composition obtained by the process as illustrated herein; and wherein high is, for example, from about 300 to about 300 to about 1,000 dots per inch; a process wherein the substrate is paper, and there is selected a printer having at least one nozzle of a channel width or diameter ranging from about 10 to about 40 microns and intercolor bleed is minimized or eliminated, and wherein said printing process is optionally accomplished with a 600 spi ink jet printer with a radiant heat assisting drying process; a process for reducing or eliminating paper curl and avoiding or minimizing smear in a xerographic ink jet apparatus which comprises generating images in said apparatus and developing said images with the ink composition obtained by the process as illustrated herein; a process wherein the ionic groups are anionic groups or moieties; a process wherein the urethanization reaction is accomplished by heating a temperature of about 40 to about 140° C., or from about 65 to about 130° C.; a process wherein (a) is present in an amount of from about 65 to about 90 weight percent; (b) is present in an amount of from about 5 to about 30 weight percent; and (c) is present in an amount of from about 3 to about 10 weight percent; an ink comprised of a vehicle, a colorant, and a polyurethane resin; and wherein the resin can be generated from a polyurethane emulsion; an ink comprised of a polyurethane resin, colorant, vehicle, and wax; and wherein the emulsion can be optionally generated from condensation polymers obtained from a number of known waxes; ink compositions comprised of colorant, polymer, and certain additives; inks comprised of a major amount of a vehicle, like water, colorant, such as dye, pigment, or mixtures thereof, a polyurethane resin emulsion, and known ink additives, such as biocides, humectants, polymeric additives, stabilizer additives, and the like. The liquid vehicle is generally present in an amount of from about 50 to about 99 percent by weight, and preferably from about 55 to about 95 percent by weight, the colorant is generally present in an amount of from about 1 to about 20 percent by weight, and preferably from about 3 to about 10 percent by weight, the polyurethane resin emulsion is generally present in an amount of from about 0.1 to about 20 percent by weight, and preferably from about 0.5 to about 10 weight percent, a biocide, when selected is generally present in an amount of from about 0 to about 10 percent by weight, and preferably from about 0.001 to about 8 percent by weight, a humectant, when selected is generally present in an amount of from about 0 to about 50 percent by weight, and preferably from about 1 to about 30 percent by weight, a polymeric additive, when present, such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide is generally present in an amount of from about 0 to about 10 percent by weight, and preferably from about 0.001 to about 8percent by weight, a stabilizer additive when present such as a mixture of secondary alcohols reacted with ethylene oxide, polyethylene oxide, alkylphenoxy-polyethylene oxide, polyethylene oxide nonylphenyl ether (the primary function of the stabilizer, for example to adjust the surface or interfacial tension of the ink, and to enhance the stability of the ink) is generally present in an amount of from about 0 to about 5 percent by weight, and preferably from about 1 to about 3 percent by weight, based on the total amount of components in the ink. The inks in embodiments possess a latency of at least about 10 to about 80 or more seconds in, for example, a printer having at least one nozzle of a channel width or diameter ranging for example, from about 10 to about 40 microns, and wherein intercolor bleed is minimized or eliminated. An important measured property for an ink jet ink is the latency or decap time, which is the length of time over which an ink remains fluid in a printhead opening or nozzle when exposed to air and, therefore, capable of firing a drop of ink at its intended target. Latency is the maximum idling time allowed for ink to be jetted by a printer with a speed equal to or greater than 5 ms (equivalent to an ink traveling a distance of 0.5 millimeter in less than 100 As) without a failure. The latency test is operated with the printhead or nozzles uncovered or decapped, and generally at a relative humidity of 15 percent. The time interval is the longest length of time that the printhead, uncovered, will still fire a specified drop without drop displacement or loss of density. The longer the latency time rating, the more desirable the ink.

Inks of the present invention can be prepared by the formation of a polyurethane resin emulsion, and wherein the urethane groups may function as a crosslinking site with carboxyl functionalities on carbon black colorant or other color pigment surfaces to thereby impart to the inks formed smear resistance, film hardness, and humidity resistance. The emulsion generated can then been subjected to aggregation and fusing with a colorant, as illustrated in the Xerox United States patents recited herein.

Also, the present invention relates to aqueous polyurethane resin emulsions comprised, for example, of from about 17 to about 60 percent by weight of a polyurethane resin, from about 0.1 to about 3 percent by weight of surfactant, and from about 33 to about 82 percent by weight of water, with a particle size for the solids of from about 0.05 micron to about 1 micron, and preferably from about 0.1 micron to about 0.5 micron in volume average diameter as measured by Coulter Counter nanosize particle analyzer, a viscosity at 25° C. of from about 10 to about 20,000 centipoise (cPs), and preferably from about 50 to about 10,000 centipoise (as determined by a Brookfield Fluid Rheometer), and a pH of from about 5.5 to about 10 and containing, for example, from about 20 to about 60 weight percent solids wherein the polyurethane resin in the emulsion can process a weight average molecular weight Mw of from about 1,500 to about 100,000, and preferably from about 2,000 to about 45,000, a number average molecular weight Mn of from about 1,000 to about 70,000, and preferably from about 1,000 to about 30,000, (Mw and Mn are determined by gel permeation chromatography using polystyrene as the standard); a hydroxyl number of from about 10 to about 300, and preferably from about 20 to about 150 mg KOH/g; a carboxyl group content corresponding to an acid number of from about 5 to about 70, and preferably from about 10 to about 40 mg KOH/g; and urethane groups (as calculated as ═NH═CO═O═, molecular weight of 59) of from about 2 to about 20, and preferably from about 5 to about 15 weight percent.

The polyurethane resin emulsions in the present invention can be generated from urethanization reaction products of:

(a) from about 50 to about 95, and preferably from about 65 to about 90 weight percent of a polyisocyanate; and (b) from about 5 to about 45, and preferably from about 5 to about 30 weight percent of a polyisocyanate; and (c) from about 1 to about 15, preferably from about 3 to about 10 weight percent of a component for incorporating therein ionic such as anionic or potential anionic groups, and wherein the urethanization reaction is accomplished by heating at temperatures of, for example, about 40 to about 140° C., and preferably from about 65 to about 130° C.

Polyester polyol (a) can be selected from polyester polyols with a hydroxyl number of from about 20 to about 450, preferably from about 25 to about 300 mg KOH/g, and an acid number of from about 0 to about 10,and preferably from about 0 to about 5 mg KOH/g, and wherein the polyester polyol can be prepared by the polycondensation of from about 0 to about 80 weight percent of a monocarboxylic acid, from about 5 to about 60 weight percent of a polycarboxylic acid, and from about 10 to about 80 weight percent of a polyol. The reaction for generating the polyester polyols can be accomplished by melt condensation or azeotropic condensation at a temperature of from about 130 to about 250° C., and preferably from about 150 to about 220° C. Examples of monocarboxylic acids are benzoic acid, tert-butylbenzoic acid, hexahydrobenzoic acid, saturated fatty acids such as 2-ethylhexanoic acid, isononanoic acid, decanoic acid, dodecanoic acid, and stearic acid, unsaturated fatty acids such as soybean oil fatty acid, soya oil fatty acid, sorbic acid, and conjugated diene fatty acid, or mixture thereof, and preferably are tert-butylbenzoic acid, stearic acid, and soybean oil fatty aci and examples of polycarboxylic acids are di-, tri-, and/or tetracarboxylic acids, and examples include phthalic acid, isophthalic acid, terephthalic acid, tetrahydrophthalic acid, maleic acid, succinic acid, fumaric acid, adipic acid, sebacic acid, phthalic anhydride, tetrahydrophthalic anhydride, hexahydrophthalic anhydride, maleic anhydride, succinic anhydride, or mixture thereof, and preferably isophthalic acid, phthalic anhydride, and hexahydrophthalic anhydride' examples of polyols are diols, triols, tetraols or higher functionality alcohols having a molecular weight of from about 62 to about 1,200, and preferably from about 62 to about 200. Examples include ethylene glycol, propylene glycol, butanediol, 1,6-hexanediol, diethylene glycol, triethylene glycol, neopentyl glycol, pentaerythriol, trimethylpentanediol, or mixture thereof, and preferably are 1,6-hexanediol, neopentyl glycol, pentaerythriol, and trimethylpentanediol.

Polyisocyanate (b) is, for example, selected from organic polyisocyanates having a molecular weight (Mw) of about 140 to about 1,500, preferably about 168 to about 318, provided that at least about 50,preferably at least about 70 and more weight percent of component in (b) is 1-methyl-2,4-diisocyanato-cyclohexane and/or 1-methyl-2,6-diisocyanato-cyclohexane. These diisocyanates are known and can be produced by the gas-phase phosgenation. In addition to these diisocyanates, component (b) can also contain other polyisocyanates such as 1,6-hexamethylene diisocyanate (HDI), 1-isocyanato-3,3,5-trimethyl-5-isocyanatomethyl-cyclohexane (IPDI), 2,4- or 2,6-diisocyanato-toluene (TDI), 4,4'-diisocyanatodicyclohexylmethane ($H_{12}$MDI), and 4,4'-diisocyanatodiphenyl-methane (MDI). Polyisocyanate component in (b) can also contain the known lacguer polyisocyanates preferably prepared from HDI, IPDI, and/or TDI.

Component (c) is preferably selected from one or more compounds containing at least one isocyanate-reactive group and having at least one anionic and/or potential ionic group. These compounds preferably are carboxylic acids having at least one, preferably one or two, hydroxyl or amino groups or their corresponding salts. Suitable acids include 2,2-bis(hydroxymethyl)-alkanecarboxylic acids (such as dimethylolacetic acid, 2,2-dimethylolpropionic acid, 2,2-dimethylolbutyfic acid, and 2,2-dimethylolpentanoic acid), dihydroxysuccinic acid, hydroxypivalic acid, and mixture thereof. Preferably acids used as component (c) are 2,2-dimethylolpropionic acid and hydroxypivalic acid.

The polyester polyurethanes can be prepared as either solvent-free or can contain about 40 to about 99 weight percent of an organic solution. For example, components (a), (c), and (d) can be introduced into a reactor, optionally in a solvent, and reacted at temperatures of about 40 to about 140° C., and preferably from about 65 to about 130° C., with component (b) until unreacted NCO groups are not detectable. In general, the relative reactant proportions are selected such that the equivalent ratio of isocyanate groups to isocyanate-reactive groups is about 0.1:1 to about 0.9:1.

The solvent selected for the urethanization can be distilled off and which solvent either forms an azeotropic mixture with a boiling point below about 100° C., or itself has a boiling point below about 100° C. Examples of solvents include N-methylpyrrolidone (NMP), diethylene glycol dimethyl ether, methyl ethyl ketone (MEK), methyl isobutyl ketone, acetone, toluene, xylene, butyl acetate, methoxypropyl acetate, or mixture thereof. The solvents chosen are not reactive with isocyanate groups. Preferred solvents are N-methylpyrrolidone, methyl ethyl ketone and xylene.

The urethanization reaction is preferably conducted in the presence of about 0.01 to about 5, and preferably of about 0.1 to about 2.5 weight percent based on the weight of the reaction mixture, of suitable catalysts. Suitable catalysts for the urethanization reaction include tertiary amines such as triethylamine; tin compounds such as tin(II) octanoate, cobalt octanoate, lead octanoate, dibutyltin oxide, and dibutyltin diluaurate. Preferred catalysts are tin(II) octanoate and triethylamine. The catalyst can be selected, for example, in an amount about 0.01 to about 5, and preferably of about 0.1 to about 2.5 weight percent based on the total weight of the reaction mixture.

Neutralization of the ionic groups, (the ionic groups, and preferred anionic groups, can provide electrostatic stabilization for the polyurethane resin emulsion and hence increase the dispersibility of the polyurethane resin in water, wherein the emulsion particle size is below about 1 micron, and preferably from 0.1 to about 0.5 microns; the anionic groups can also used directly for the adhesive bonding between the polyurethane resin and the paper substrates) may be accomplished before or during the urethanization reaction, during or after the dispersion of the polyeter urethane in water by the addition of a base. The neutralization can be accomplished with aqueous solutions of alkali metal hydroxides or with amines, with the degree of neutralization being determined by acid titration with a KOH aqueous solution after the polymer resin has been treated with a base. Based on the amount of KOH used, the amount of acid groups such as carboryl groups, incorporated can be estimated, and wherein the percentage of neutralization can be calculated) and wherein the degree of neutralization is, for example, about 20 to about 100, preferably about 50 to about 100 percent of the incorporated acid groups.

Suitable bases for neutralization include ammonia, N-methyl-morpholine, dimethylisopropanolamine, triethylamine, ethanolamine, dimethylethanolamine, methyldiethanolamine, triethanolamine, morpholine, tripropylamine, triisopropanolamine, 2-diethylamino-2-methyl-1-propanol, or mixture thereof. Also suitable neutralizing agents are sodium hydroxide, lithium hydroxide, and potassium hydroxide. Preferred neutralizing agents are ammonia, triethylamine, and dimethylethanolamine.

After the synthesis, either in the melt or in an organic solvent, the polyurethanes can be converted into an aqueous dispersion by the addition of water. The dispersion step is generally accomplished at about 40 to about 120° C. In the dispersion step, the water/neutralizing agent mixture may be added to the polyurethane resin, water may be added to the polyurethane resin/neutralizing agent mixture, or the polyurethane resin may be added to the water/neutralizing agent mixture. The surface tension of the polyurethane resin emulsion can be lower than about 50 dynes/cm, and preferably from about 30 to 45 dynes/cm, thereby increasing the dispersibility of the polyurethane resin by the use of external emulsifiers, such as nonionic surfactants. Examples of nonionic surfactants are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-850™, IGEPAL CO-890™, IGEPAL CO-720™, IGEPAL CO-290™, IGEPAL CA-210™, ANTAROX 890™ and ANTAROX 897™, and hydrolyzable or cleavable nonionic surfactants of the formulas illustrated in U.S. Pat. No. 5,814,138, such as poly(ethylene glycol) methyl p-tert-octylphenyl phosphate, wherein the surfactant contains, for example, 40 ethylene glycol units, poly(ethylene glycol)-α-methyl ether-ω-methyl p-tert-octylphenyl phosphate (wherein the surfactant contains 17 ethylene glycol units, wherein the external emulsifier is selected in an amount of from about 0.05 to about 6, and preferably from about 0.1 to about 3 weight percent based on the polyurethane resin.

The present invention also relates to a high resolution printing process comprising applying in imagewise fashion to a substrate the invention ink in a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a printing process which comprises incorporating into an acoustic ink jet printer the invention ink with a viscosity of from about 0.7 to about 5 centipoise at a temperature of from about 25 degree Centigrade to about 50 degree Centigrade, and causing droplets of the ink to be ejected in imagewise pattern onto a substrate; a process which comprises (a) providing a acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and which ink possesses a viscosity of from about 0.7 to about 5 centipoise at a temperature of from about 25 degree Centigrade to about 50 degree Centigrade, and (b) causing droplets of the ink to be ejected onto a recording sheet in an imagewise pattern at a temperature of from about 20 degree Centigrade to about 50 degree Centigrade; an imaging process which comprises the development of an image with an aqueous ink jet ink composition comprised of colorant, such as dye or pigment, water, and additives as indicated herein, and wherein images with acceptable, or low intercolor bleed, photo like quality, waterfastness, for example from about 90 to about 99 percent, and minimal curling and minimal smearing are obtained; and a high resolution printing process comprising applying in imagewise fashion to a substrate in a printer having at least one nozzle of a channel width or diameter ranging from about 10 to about 40 microns. Also, the inks and imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable photo like quality, and low intercolor bleed, on substrates such as paper.

Examples of vehicles selected for the inks include water, gylocols, mixtures of glycols, a mixture of water and a miscible organic component, such as a glycol, such as ethylene glycol, propylene glycol, diethylene glycols, glycerine, dipropylene glycols, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 50 to about 99 and preferably about 98.9 percent by weight, based on the total amount of components in the ink, and more preferably from about 55 to about 95 percent by weight, and still more preferably from about 60 to about 90 percent by weight, although the amounts may be outside these ranges in embodiments. The total of all ink components is about 100 percent, or 100 parts. Also, there can be selected other vehicles not specifically recited herein.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally serves as a humectant and possesses a boiling point higher than that of water (100° C.). The colorant, such as a pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediol, 1,6 hexanediol, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, N-methylpyrrolidinone, N-cyclohexylpyrrolidinone, N,N-diethyltoluamide, and the like, ethers such as alkyl ether derivatives of alcohol, etherdiols, and ether triols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, surfactants, pH buffer, biocides, chelating agents (EDTA and the like), and optional additives can also be selected for the inks.

The colorant for the ink compositions of the present invention includes a dye, pigment, mixtures of dye and pigment, mixture of dyes, a mixture of one or more pigments, and the like. The colorant can be black, cyan, magenta, yellow, red, blue, green, orange, brown, mixtures thereof, and the like, and is preferably carbon black, such as Levanyl carbon black obtained from Bayer. Examples of suitable black pigments include various carbon blacks such as channel black, furnace black, lamp black, and the like. Colored pigments, or dyes include red, green, blue, brown, magenta, cyan, yellow, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SEGLN, CI Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot IJX56, and Levanyl Black A-SF. Of these, Levanyl Black A-SF, Cabot IJX56, and Cabot CSX-440L Cabojet 300 and the like are the most preferred. Examples of suitable colorants, especially pigments that may be selected in embodiments are illustrated in U.S. Pat. No. 5,556,727, the disclosure of which is totally incorporated herein by reference.

Examples of suitable dyes include reactive dyes, direct dyes, anionic dyes, acid dyes, food dyes, and the like. Specific examples of suitable dyes include the ProJet dyes available from Zeneca (ICI) such as ProJet Yellow 1G, ProJet Yellow OAM, and ProJet Fast Yellow 2, ProJet Cyan 1, ProJet Fast Cyan 2, ProJet Magenta 3B-OA, ProJet Magenta 1T, ProJet Magenta 1, ProJet Fast Magenta 2, ProJet Fast Black 2. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon.

Preferably, the colorant, especially pigment particle size is small to enable a stable colloidal suspension of the particles in the liquid vehicle and to prevent clogging of the ink channels when the ink is used in a thermal ink jet printer. Preferred colorant particle average diameters are generally from about 0.001 to about 2 microns, and more preferably from about 0.01 to about 1 micron in volume average diameter, although the particle size can be outside these ranges. A more preferred pigment particle size includes particles having at least 70 percent of the particles being below 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

The colorant, such as pigment is present in the ink composition in various effective amounts and generally from about 1 to about 20 percent by weight, preferably from about 3 to about 10 percent by weight, more preferably from about 4 to about 9 percent by weight, and most preferably from about 4 to about 8 percent, although the amount can be outside of these ranges.

Polymeric additives can also be added to the inks, for example, to about 0.02 weight percent to about 10 weight percent, to enhance the viscosity of the ink, and such additives include water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. The polymeric additives may be present in the ink of the present invention in amounts of from 0 to about 10 percent by weight, preferably from about 0.001 to about 8 percent by weight, and more preferably from about 0.01 to about 5 percent by weight, although the amount can be outside these ranges. A preferred polymeric additive is described in copending application U.S. Ser. No. 536,236 the disclosure of which are totally incorporated herein by reference, which additives are especially useful as colorant like carbon black stabilizers. Also, the self-emulsifying sulfolated polyesters disclosed in U.S. Ser. No. 536,236 can be selected as additives in various appropriate amounts and preferably in amounts of from about 0.1 weight percent to about 12 weight percent and more preferably from about 1 weight percent to about 8 weight percent. The preferred polyesters have a glass transition temperature ranging from about 0° to about 80° C. and preferably between about 20° C. and about 65° C. One selected polyester is a sulfonated polyester with about 7.5 percent sulfonation, weight average molecular weight of about 2,080, Mn of about 1,043, Tg of about 54.9° C., and softening point of about 135° C.

Examples of specific optional ink additives that may be selected include biocides, such as DOWICIL® 150 (o-phenylphenol), 200 (Quaternium-15), and 75 (1-(3-chloroallyl)-3,5,7-triaza-1-azoniaadamantane chloride), benzoate salts, sorbate salts, 1,2-benzisothiazolinone also known as Proxel GXL products obtained from Zeneca Chemicals and the like, present in an amount of from 0 to about 10 percent by weight, preferably from about 0.001 to about 8 percent by weight, and more preferably from about 0.01 to about 4.0 percent by weight, although the amount can be outside these ranges; penetration control additives, such as N-methylpyrrolidinone, 2-pyrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 1 to about 30 percent by weight, although the amount can be outside these ranges; pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; and penetrants, as illustrated herein, such as butyl carbitol, and cyclohexylpyrrolidinone in amounts for example of from about 0.1 to about 20 percent by weight and preferably from about 0.5 to about 10 percent by weight, and the like Examples of suitable ink additives include those illustrated in U.S. Pat. No. 5,223,026 and U.S. Pat. No. 5,207,825, the disclosures of each patent being totally incorporated herein by reference, including the alcohol surfactants illustrated herein, and more specifically, a mixture of secondary alcohols reacted with ethylene oxide, such Tergitol 15-S series surfactants available from Union Carbide, polyethylene oxide, alkylphenoxy-polyethylene oxide, such as Triton X-100 available from Aldrich Chemical Company, polyethylene oxide nonylphenyl ether available as IGEPAL from Rhodia, or as ANTAROX from Rhone Poulenc. The surfactants are utilized in various effective amounts, such as for example from about 0 to about 5 percent, and from 1 to about 3 weight percent by weight of the ink.

For the final ink jet ink compositions of the present invention, a number of physical properties may be desirable, for example ink compositions for use in ink jet recording processes should have appropriate viscosity, surface tension and pH characteristics. The ink should, for example, possess liquid properties, such as viscosity, surface tension and pH, optimized for the discharging conditions of the printing apparatus, such as the thermal ink jet heater temperature increase. The ink compositions possess surface tensions of for example, greater than about 25 dynes/cm$^2$, preferably greater than about 30 dynes/cm$^2$ and more preferably greater than about 40, such as from about 40 to about 100, dynes/cm$^2$, a viscosity is of, for example, less than about 10 cps, preferably less than about 8 cps, and more preferably less than about 5 cps, such as from about 1 to about 5 cps. The surface tension can be measured with a Kruss Model K10 tensiometer, and the viscosity can be determined at about 25° C. by a Brookfield Fluid Rheometer.

The inks of the present invention possess in embodiments superior ink stability, for example they maintain a substantially constant viscosity ranging from about 1.3 centipoise to about 5 centipoise at 25 degrees centigrade at a spindel rate of 60 rpms as measured by a Brookfield Fluid Rheometer, suitable pH as measured by a pH electrode and meter, and ranging for example, from a pH of about 3 to about 10. Moreover, the inks in embodiments do not exhibit visible pigment or emulsion particle settling behavior for extended time periods, for example over six months, and more specifically, from about six months to about two years.

The substantially constant viscosity, pH, surface tension, and lack of particulate settling is maintained despite stressing the ink measured by, for example, permitting the ink to remain in a bottle at room temperature, for example about 25° C., then subjecting the ink to heating at about 60° C. (degrees Centigrade) for 24 hours or 50° C. for 30 days; or subjecting the ink to freezing at −30° C. followed by thawing at room temperature. Under these stress conditions, the viscosity of the ink does not substantially increase or decrease more than about 0.5 cPs (centipoise). A substantial viscosity change, for example from 3 centipoise (cPs) to about 4 centipoise, may cause the ink to be nonjettable, and/or may render the ink incapable of passing through the jetting device filter. An adverse change in ink viscosity may result in the lack of refilling ink to the jetting device, and thus subsequent loss of jetting channel refill and drops not being fired from the jetting device. Subjecting the inks to temperatures below about 0 degrees Celsius, such as −40° C., and thereafter thawing the inks, an extreme condition which may occur during transportation of the ink in winter, or cold climates, evidenced no visible ink settling or precipitate of the ink, such as the pigment, the resin emulsion particles, and pigment with other ink components. Visible settling or precipitates, after the ink has remained at 25° C., would cause ink jet nozzle clogging, and therefore, effect the line edge raggedness, optical density, or mottle of the images. Also, the settling of the ink would permit a nonhomogeneous mixture which may also cause storage problems such as in an ink tank containing a wicking device. Further, the inks of the present invention may not require additional special additives, such as the prior art saccharinepolyols, for long shelf stability or excellent jetting performance.

Moreover, the inks of the present invention in embodiments possess excellent latency of at least about 10 seconds, that is, for example, from about 10 seconds to about 1,000 seconds, with a minimum latency of at least about 30 seconds being preferred.

The inks of the present invention possess excellent dry and wet smear resistance, that is a dry smear optical density of at least less than about 0.10, more generally a dry smear optical density of preferably from about 0 to about 0.07. (the less OD values for smear indicate less transfer onto people). The OD smear is a measure of how much ink or developed image can be removed from the original image as compared with a print image of the same ink without the polyurethane resin. The wet smear optical density of the inks is at least about 0.20, and more generally the wet smear optical density is about 0.10, and preferably from about 0 to about 0.10. The advantage to reduction in smear is that the productivity of the output of prints can be increased, when the smear is reduced. If reduced, the page to page contact is unaffected by smeared images on the backside of pages. Also, less of the image would be transferred to people's fingers etc. Another advantage, is possibly for highlighter smearing. Less smear would enable less transfer when a highlighter pen is drawn across the image, or when liquids are spilled and wiped up.

The inks may be applied to a suitable substrate in image-wise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, Xerox Color Expressions, or the like, coated papers, such as those available from Jujo, transparency materials suitable for aqueous inks or ink jet printing processes, or the like.

The following Examples are provided.

EVALUATIONS

The properties of the following prepared ink compositions were evaluated as follows:

A) Physical Properties:

The viscosity of the ink was measured at 25° C. using a Brookfield Model DV-11 viscometer.

The surface tension of the ink was measured at 25° C. using a Kruss model K10T plate tensiometer.

The pH was measured at 25° C. using a Corning model 345 pH meter.

B) Dry Smear Resistance:

The inks were placed in an ink jet printer HP850C (Hewlett Packard). After an image was printed, the image was allowed to stand, or remain at room temperature, about 25° C. throughout, for 24 hours prior to evaluation. The optical density of the solid area was measured prior to smear testing using a densitometer (X-Rite 428). The images were printed on several media such as Xerox Courtland 4024DP and Image Series LX paper. A clean sheet of the matching paper was placed on top of the solid area image. Using a rub tester (Manufactured by Testing Machines Inc.), a 4 pound weight was placed on top of the covered image. At a speed of 85 rubs per minute, the image was subjected to 50 rubs at 25° C. and 50 percent RH. The area adjacent to the solid area image was measured using the densitometer.

C) Wet Smear Resistance:

The inks were placed in an ink jet printer jet printer HP850C (Hewlett Packard) and imaged with lines on it. After a lined image was printed, the image was allowed to stand, or remain at room temperature for 24 hours prior to evaluation. The optical density of the solid area was measured prior to smear testing using a densitometer (X-Rite 428). The images were printed on several media such as Xerox Courtland 4024DP and Image Series LX paper. An inhouse micro wet smear test fixture was used to smear the image with the use of water wetted chisel tips (similar to highlighter felt tips). The saturated tips was assembled into a mechanical pen. The mechanical pen equipped with the wetted tip was traversed across the image at a force of 80 to 100 grams. This procedure was repeated three times across unsmeared regions of the image. The optical density of the area between the printed lines was measured and averaged over at least ten measurements. The optical density of the background of the media was subtracted from the optical density adjacent to the image.

D) Stability:

50 Grams of ink were placed in a capped bottle and allowed to stand at a temperature of 60° C. for 24 hours. The ink physical properties were measured after heat treatment. For comparison, the shelf standing ink was also measured for physical properties. Large changes greater than 0.3 centipoise units for viscosity indicated instability. Other physical properties, such as surface tension or pH, were monitored, and changes of 3 dynes/cm or a change in pH by more than about 0.5 would indicate instability. Observation of the ink standing on the shelf at room temperature, about 25° C. throughout, for settling was also tested.

E) Optical Density:

An image was printed by an ink jet printer HP855C on each of the following papers: Xerox Courtland 4024DP and Images Series LX. The optical density of the printed image was measured by an X-Rite densitometer.

The ink may be applied to a suitable substrate in image-wise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox series 10 paper, Xerox 4024 paper, or the like, coated papers, such as those available from Jujo, transparency materials suitable for aqueous inks or ink jet printing processes, or the like.

The following Examples, Comparative Examples and data are provided.

EXAMPLE I

A polyester polyurethane resin emulsion was prepared as follows:

(A) Preparation of a polyester polyol:

In a 5 liter jacketed glass flask equipped with a mechanical stirrer, 328 grams of phthalic anhydride, 368 grams of isophthalic acid, 1,207 grams of pentaerythritol, and 2,484 grams of soybean oil was heated at 210° C. for 6 hours and condensed until the acid number was about 2.5. The resulting polester polyol had a hydroxyl number of 167.

(B) Preparation of a polyester polyurethane resin emulsion:

In a 5 liter jacketed glass flask equipped with a mechanical stirrer, 750 grams of the above prepared polyester polyol, 59 grams of dimethylolpropionic acid, 145 grams of N-methylpyrrolidone, and 24.5 grams of triethylamine were homogenized at 5,000 rpm at 80° C. for 30 minutes. Then 160 grams of a mixture containing 80 weight percent of 1-methyl-2,4-diisocyanatocyclohxane and 20 weight percent of 1 -methyl-2,6-diisocyanatocyclohexane were added into the reaction flask, and the entire reaction mixture was heated to 110° C. The reaction was continued until NCO groups were no longer detectable by IR-spectroscopy. 12 grams of IGEPAL CO-850™ (nonylphenol ethoxylate, available from Rhodia) and 29 grams of tin(II) octanoate were added, and the mixture in the flask was homogenized at 5,000 rpm at 110° C. for 15 minutes then cooled down to 100° C. The resulting polyurethane resin solution was sequentially dispersed in 1,250 grams of deionized water at 60° C. for 1 hour, then sequentially homogenized at 10,000 rpm at 60° C. for 30 minutes. The resulting polyurethane resin emulsion after cooling throughout possessed a weight average molecular weight Mw of 35,000, a number average molecular weight Mn of 16,900, as determined on a Waters GPC and a volume average diameter for the polymer of 450 nanometers as measured by light scattering technique on a Coulter N4 Plus Particle Sizer. The polyurethane resin emulsion product was comprised of 41 percent by weight of polyurethane resin, 0.5 percent by weight IGEPAL CO-850™ (nonylphenol ethoxylate), and 58.5 percent by weight of water. Also, the polyurethane resin possesed a hydroxyl number of 84 mg KOH/g, an acid number of 35 mg KOH/g, and a viscosity of 810 centipoise at 25° C., as determined by a Brookfield Fluid Rheometer.

EXAMPLE IA

An ink comprised of 3 percent by weight of CABOT IJX56 carbon black obtained from Cabot Corporation, 22 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 1 percent by weight of the polyurethane resin emulsion of Example I (the emulsion was comprised of 41 percent by weight of polyurethane resin, 0.5 percent by weight IGEPAL CO-850 ™ (nonylphenol ethoxylate), and 58.5 percent by weight of water) was prepared by dissolution of the polyethyleneoxide in water through simple agitation using a stir bar for about 5 minutes, followed by the addition of sulfolane, 2-pyrrolidinone and the polyurethane resin emulsion. This mixture was added to a stirring solution of CABOT IJX56 carbon black. The ink mixture was stirred with a stir bar for about 5 to about 10 minutes, and the resulting ink mixture was filtered through a 1 $\mu$m glass fiber filter. The resulting ink was comprised of 3 percent by weight of CABOT IJX56 carbon black, 22 percent by weight of sulfolane, 6 percent by weight of 2-pyrrolidinone, 0.05 percent by weight of polyethyleneoxide ($M_w$=18,500), 1 percent by weight of the polyurethane resin emulsion, and 67.95 percent by weight of water.

EXAMPLE IB

An ink comprised of 3 percent by weight of CABOT IJX56 carbon black obtained from Cabot Corporation, 22 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 3.5 percent by weight of the polyurethane resin emulsion of Example I (the emulsion was comprised of 41 percent by weight of polyurethane resin, 0.5 percent by weight IGEPAL CO-850™ (nonylphenol ethoxylate), and 58.5 percent by weight of water) was prepared by dissolution of the polyethyleneoxide in water through simple agitation using a stir bar for about 5 minutes, followed by the addition of sulfolane, 2-pyrrolidinone and the polyurethane resin emulsion. This mixture was added to a stirring solution of CABOT IJX56 carbon black. The ink mixture was stirred with a stir bar for about 5 to about 10 minutes, and the resulting ink mixture was filtered through a 1 $\mu$m glass fiber filter. The resulting ink comprised of 3 percent by weight of CABOT IJX56 carbon black, 22 percent by weight of sulfolane, 6 percent by weight of 2-pyrrolidinone, 0.05 percent by weight of polyethyleneoxide ($M_w$=18,500), 3.5 percent by weight of the polyurethane resin emulsion, and 65.45 percent by weight of water.

EXAMPLE II

A polyester polyurethane resin emulsion was prepared as follows:

(A) Preparation of a polyester-polyol:

In a 5 liter jacketed glass flask equipped with a mechanical stirrer, 2,056 grams of phthalic anhydride, 346 grams of stearic acid, 535 grams of trimethylolpropane, 1,000 grams of neopentyl glycol, and 567 grams of 1,6-hexanediol were added. The mixture was heated at 210° C. for 6 hours and condensed until the acid number was about 3. The resulting polester polyol had a hydroxyl number of 158.

(B) Preparation of a polyester polyurethane resin emulsion:

In a 5 liter jacketed glass flask equipped with a mechanical stirrer, 1,053 grams of the above prepared polyester polyol, 50 grams of dimethylolpropionic acid, 188 grams of xylene, and 1.6 grams of tin(II) octanoate were homogenized at 5,000 rpm at 90° C. for 30 minutes. Then 148 grams of a mixture containing 80 weight percent of 1-methyl-2,4-diisocyanatocyclohxane and 20 weight percent of 1-methyl-2,6-diisocyanatocyclohexane were added into the flask, and the whole reaction mixture was heated to 130° C. Reaction was continued until NCO groups were no longer detectable by IR-spectroscopy. 16 Grams of IGEPAL CO-850™ (nonylphenol ethoxylate, available from Rhodia) and 31 grams of dimethylethanolamine were then added, and the mixture was dispersed in 1,575 grams of deionized water at 60° C. for 1 hour, then sequentially homogenized at 10,000 rpm at 60° C. for 30 minutes. The resulting polyurethane resin after cooling throughout, possessed a weight average molecular weight of 39,000, an a number average molecular weight Mn of 18,200, as determined on a Waters GPC, and a volume average diameter for the polymer of 275 nanometers as measured by light scattering technique on a Coulter N4 Plus Particle Sizer. The polyurethane resin emulsion product was comprised of 42 percent by weight of polyurethane resin, 0.5 percent by weight IGEPAL CO-850™ (nonylphenol ethoxylate), and 57.5 percent by weight of water. Also, the polyurethane resin possessed a hydroxyl number of 79 mg KOH/g, an acid number of 22 mg KOH/g, and a viscosity of 350 centipoise at 25° C., as determined by a Brookfield Fluid Rheometer.

EXAMPLE IIA

An ink comprised of 3 percent by weight of CABOT IJX56 carbon black obtained from Cabot Corporation, 22 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 1 percent by weight of the polyurethane resin emulsion of Example II (comprised of 42 percent by weight of polyurethane resin, 0.5 percent by weight IGEPAL CO-850™ (nonylphenol ethoxylate), and 57.5 percent by weight of water) was prepared by dissolution of the polyethyleneoxide in water through simple agitation using a stir bar for about 5 minutes, followed by the addition of sulfolane, 2-pyrrolidinone and the polyurethane resin emulsion. This mixture was added to a stirring solution of CABOT IJX56 carbon black. The ink mixture was stirred with a stir bar for about 5 to about 10 minutes, and the resulting ink mixture was filtered through a 1 $\mu$m glass fiber filter. The resulting ink was comprised of 3 percent by weight of CABOT IJX56 carbon black, 22 percent by weight of sulfolane, 6 percent by weight of 2-pyrrolidinone, 0.05 percent by weight of polyethyleneoxide ($M_w$=18,500), 1 percent by weight of the polyurethane resin emulsion, and 67.95 percent by weight of water.

COMPARATIVE EXAMPLE IA

A comparative ink was prepared containing no polyurethane resin emulsion. This ink was comprised of 3 percent by weight of CABOT IJX56 carbon black obtained from Cabot Corporation, 22 percent by weight of sulfolane (obtained from Bayer), 6 percent by weight of 2-pyrrolidinone, and 0.05 percent by weight of polyethyleneoxide ($M_w$=18,500 grams/mole) (obtained from Polysciences), was prepared by dissolution of the polyethyleneoxide in water through simple agitation using a stir bar for about 5 minutes, followed by the addition of sulfolane, and 2-pyrrolidinone This mixture was added to a stirring solution of CABOT IJX56 carbon black. The ink mixture was stirred with a stir bar for about 5 to about 10 minutes, and the resulting ink mixture was filtered through a 1 $\mu$m glass fiber filter. The resulting ink was comprised of 3 percent by weight of CABOT IJX56 carbon black, 22 percent by weight of sulfolane, 6 percent by weight of 2-pyrrolidinone, 0.05 percent by weight of polyethyleneoxide ($M_w$=18,500), and 68.95 percent by weight of water.

Physical Properties of the Inks and Stability Testing Measured at 25° C.

| | | | | 60° C./24 Hour Heat Tretment | | |
|---|---|---|---|---|---|---|
| Example | Viscosity cPs | Surface Tension D/cm | pH | Viscosity cPs | Surface Tension D/cm | pH |
| IA | 2.10 | 34.6 | 6.57 | 2.01 | 35.3 | 6.40 |
| IB | 2.33 | 35.7 | 6.36 | 2.20 | 36.7 | 6.21 |
| IIA | 1.95 | 35.1 | 6.52 | 1.89 | 35.9 | 6.42 |
| Comparative IA | 2.12 | 37.3 | 6.48 | 2.08 | 37.9 | 6.38 |

In the above Examples, the inks exhibit good stability at room temperature and also when subjected to 60° C. heat treatment. (Large changes greater than 0.3 centipoise units for viscosity indicated instability. Other physical properties, such as surface tension or pH, were monitored, and changes of 3 dynes/cm or a change in pH by more than about 0.5 would indicate instability.) The inks of these examples did not appear to be affected by the addition of polyurethane resin emulsion in the context of instability due to heat treatment or upon standing. The inks were shelf stable with no evidence of settling or precipitates for at least 8 months at about 25° C. (The substantially constant viscosity, pH, and surface tension, is maintained despite stressing the ink by, permitting the ink to remain in a bottle at room temperature, for example about 25° C., then subjecting the ink to heating at about 60° C. (degrees Centigrade) for 24 hours. Under these stress conditions, the viscosity of the ink does not substantially increase or decrease more than about 0.5 cPs (centipoise), the surface tension of the ink does not substantially increase or decrease more than about 1 dyne/cm.) The ink physical properties were measured after 60° C. heat treatment. Large changes greater than 0.3 centipoise units for viscosity indicated instability. Other physical properties, such as surface tension or pH, were monitored, and changes of 3 dynes/cm or a change in pH by more than about 0.5 would indicate instability.

Optical Density and Smear Attributes

| | Optical Density | | Smear OD | |
|---|---|---|---|---|
| Example | Xerox 4024DP | Image Series LX | Xerox 4024DP | Image Series LX |
| IA | 1.43 | 1.46 | 0.04 | 0.05 |
| IB | 1.46 | 1.49 | 0.03 | 0.03 |
| IIA | 1.42 | 1.48 | 0.04 | 0.05 |
| Comparative IA | 1.33 | 1.37 | 0.17 | 0.19 |

The inks of the invention Examples exhibited higher optical density as compared to the corresponding Comparative Example. The smear resistance is evident in the reduction in smear optical density. Printing multiple sheets sequentially avoided page to page contact since the image is unaffected or not transferred to the backside of pages. A reduction in smear resistance enables a more rapid handling of documents by customers. Since the wet smear test used water, the inks can be used for highlighters that are water based. Another ink advantage is for highlighter smearing. Fewer smears would enable less transfer when a highlighter pen is drawn across the image, or when liquids are spilled and wiped up. With a polyurethane resin emulsion, the adhesion occurring with pigment to pigment or pigment to latex enables binding to the paper fibers, and colorant to colorant binding. This enables the performance of a reduction in smear. Without the polyurethane resin emulsion, smear is significant and would transfer during handling of the paper onto fingers, backside of papers), hence productivity is lost.

| | Wet Smear OD | |
|---|---|---|
| Example | Xerox 4024DP | Image Series LX |
| IA | 0.05 | 0.05 |
| IB | 0.04 | 0.03 |
| IIA | 0.06 | 0.07 |
| Comparative IA | 0.30 | 0.31 |

The wet smear resistance in Xerox 4024DP and Image series LX papers is significantly improved through the use of the polyurethane resin emulsions. The wet smear OD for inks without polyurethane resin emulsion was about from 0.20 to about 0.21. The wet smear resistance is significantly improved through the use of the polyurethane resin emulsions as the wet smear OD for inks with polyurethane resin emulsions was about from 0.05 to about 0.08.

Other modifications of the present invention may occur to those skilled in the art subsequent to a review of the present application and these modifications, including equivalents thereof, are intended to be included within the scope of the present invention.

What is claimed is:

1. A process for the preparation of an ink which comprises mixing an ink vehicle, a colorant and a polyurethane resin emulsion.

2. A process in accordance with claim 1 wherein said polyurethane resin emulsion is generated from the urethanization of (a) from about 50 to about 95 weight percent of a polyester polyol;

(b) from about 5 to about 45 weight percent of a polyisocyanate; and (c) from about 1 to about 15 weight percent of ionic groups and wherein the total of said components (a) to (c) is about 100 percent.

3. A process in accordance with claim 2 wherein said polyester polyol is generated by the polycondensation of from about 0 to about 80 weight percent of a monocarboxylic acid, from about 5 to about 60 weight percent of a polycarboxylic acid, and from about 10 to about 80 weight percent of a polyol.

4. A process in accordance with claim 1 wherein said polyurethane resin emulsion particles possesses a particle size of from about 0.05 microns to about 1 microns.

5. A process in accordance with claim 1 wherein said polyurethane resin possesses a viscosity at 25° C. of from about 10 to about 20,000 centipoise (cPs).

6. A process in accordance with claim 1 wherein said polyurethane resin possesses a weight average molecular weight Mw of from about 1,500 to about 100,000.

7. A process in accordance with claim 1 wherein said polyurethane resin possesses a number average molecular weight Mn of from about 1,000 to about 70,000.

8. A process in accordance with claim 1 wherein said polyurethane resin possesses a hydroxyl number of from about 10 to about 300.

9. A process in accordance with claim 1 wherein said polyurethane resin possesses a carboxyl group content corresponding to an acid number of from about 5 to about 70.

10. A process in accordance with claim 1 wherein said polyurethane resin possesses urethane groups calculated as NH—CO—O—, molecular weight, Mw of 59, of from about 2 to about 20.

11. A process in accordance with claim 2 wherein (a) is prepared by the polycondensation of from about 1 to about 80 weight percent of a monocarboxylic acid, from about 5 to about 60 weight percent of a polycarboxylic acid, and from about 10 to about 80 weight percent of a polyol, wherein said monocarboxylic acid is benzoic acid, tert-butylbenzoic acid, hexahydrobenzoic acid, saturated fatty acids of 2-ethylhexanoic acid, isononanoic acid, decanoic acid, dodecanoic acid, and stearic acid, unsaturated fatty acids such of soybean oil fatty acid, soya oil fatty acid, sorbic acid, and conjugated diene fatty acid, or mixtures thereof; wherein the polycarboxylic acid is di-, tri-, and/or tetracarboxylic acids of phthalic acid, isophthalic acid, terephthalic acid, tetrahydrophthalic acid, maleic acid, succinic acid, fumaric acid, adipic acid, sebacic acid, phthalic anhydride, tetrahydrophthalic anhydride, hexahydrophthalic anhydride, maleic anhydride, succinic anhydride, or mixtures thereof, and wherein the polyol is ethylene glycol, propylene glycol, butanediol, 1,6-hexanediol, diethylene glycol, triethylene glycol, neopentyl glycol, pentaerythriol, trimethylpentanediol, or mixture thereof; the polyisocyanate (b) is 1-methyl-2,4-diisocyanato-cyclohexane, 1-methyl-2,6-diisocyanato-cyclohexane, 1,6-hexamethylene diisocyanate (HDI), 1-isocyanato-3,3,5-trimethyl-5-isocyanatomethyl-cyclohexane (IPDI), 2,4- or 2,6-diisocyanato-toluene (TDI), 4,4'-diisocyanatodicyclohexylmethane ($H_{12}$MDI), or 4,4'-diisocyanatodiphenyl-methane (MDI); and wherein (c) is obtained from 2,2-bis(hydroxymethyl)-alkanecarboxylic acids of dimethylolacetic acid, 2,2-dimethylolpropionic acid, 2,2-dimethylolbutyfic acid, and 2,2-dimethylolpentanoic acid), dihydroxysuccinic acid, hydroxypivalic acid, and mixtures thereof.

12. A process in accordance with claim 2 wherein said monocarboxylic acid selected for generation of said polyester polyol (a) are tert-butylbenzoic acid, stearic acid, or soybean oil fatty acid; wherein the polycarboxylic acids selected for the generation of said polyester polyol (a) is isophthalic acid, phthalic anhydride, or hexahydrophthalic anhydride; or wherein the polyol selected for generation of said polyester polyol (a) is 1,6-hexanediol, neopentyl glycol, pentaerythriol, or trimethylpentanediol; wherein the polyisocyanates (b) are 1-methyl-2,4-diisocyanato-cyclohexane, 1-methyl-2,6-diisocyanato-cyclohexane, and 1-isocyanato-3,3,5-trimethyl-5-isocyanatomethyl-cyclohexane (IPDI); wherein the ionic groups (c) were obtained from acids of component (c) of 2,2-dimethylolpropionic acid and hydroxypivalic acid.

13. A process in accordance with claim 2 wherein the polyurethane resin contained in the polyurethane emulsion is generated from the urethanization of from about 50 to about 95; from about 5 to about 45; and from about 1 to about 15 that will enable incorporation for ionic groups.

14. A process in accordance with claim 1 wherein the polyurethane resin emulsion is comprised of from about 17 to about 60 percent by weight of polyurethane resin, from about 0.1 to about 3 percent by weight of surfactant, and from about 33 to about 82 percent by weight of water.

15. A process in accordance with claim 14 wherein said polyurethane resin is present in an amount of from about 20 to about 50 weight percent.

16. A process in accordance with claim 14 wherein the total of said components is about 100 percent.

17. A process in accordance with claim 1 wherein the colorant is a dye.

18. A process in accordance with claim 1 wherein the colorant is a pigment.

19. A process in accordance with claim 1 wherein the emulsion contains water.

20. A process in accordance with claim 1 wherein there is added to the ink obtained ink additives.

21. A process in accordance with claim 20 wherein the vehicle is water, a glycol, or a mixture of glycols. or a mixture of water and a miscible organic component of ethylene glycol, propylene glycol, diethylene glycols, glycerine, dipropylene glycol, polyethylene glycol, or polypropylene glycols.

22. A process in accordance with claim 1 further utilizing ink additives of surfactants of poly(ethylene glycol) monolaurate, poly(ethylene glycol) monoricinoleate, poly (ethylene glycol) lanolin alcohol ether, poly(ethylene glycol) monooleate, poly(ethylene glycol) castor oil, poly (ethylene glycol) tetramethyl optionally decynediol, or poly (ethylene glycol) lanolin, and which surfactants are present in an amount of from about 0.01 to about 7 weight percent or parts based on the total ink components.

23. A process in accordance with claim 1 further containing ink additives of a biocide, a humectant, or mixtures thereof.

24. A high resolution printing process comprising applying in imagewise fashion to a substrate an ink composition obtained by the process of claim 1.

25. A process in accordance with claim 24 wherein said high is from about 300 to about 1,000 dots per inch.

26. A process in accordance with claim 24 wherein the substrate is paper, and there is selected a printer having at least one nozzle of a channel width or diameter ranging from about 10 to about 40 microns and intercolor bleed is minimized or eliminated, and wherein said printing process is optionally accomplished with a 600 spi ink jet printer with a radiant heat assisting drying process.

27. A process for reducing or eliminating paper curl and avoiding or minimizing smear in a xerographic ink jet apparatus which comprises generating images in said apparatus and developing said images with the ink composition obtained by the process of claim 1.

28. A process in accordance with claim 2 wherein said ionic groups are anionic groups or moieties.

29. A process in accordance with claim 2 wherein the urethanization reaction is accomplished by heating a temperature of about 40 to about 140° C.

30. A process in accordance with claim 2 wherein (a) is present in an amount of from about 65 to about 90 weight percent; (b) is present in an amount of from about 5 to about 30 weight percent; and (c) is present in an amount of from about 3 to about 10 weight percent.

31. An ink obtained by the process of claim 1.

32. An ink comprised of a vehicle, a colorant, and a polyurethane resin.

33. An ink in accordance with claim 32 wherein said resin is generated from a polyurethane emulsion.

34. An ink in accordance with claim 33 wherein said resin is generated from polymeric emulsions obtained from waxes.

35. An ink comprised of a vehicle, a colorant and a condensation generated polymer of phenoplasts, aminoplasts, alkyds, polyesters, polyamides, epoxy, or mixtures thereof.

36. A process in accordance with claim 4 wherein said particle size is from about 0.1 micron to about 0.5 micron.

37. A process in accordance with claim 5 wherein said viscosity is from about 50 to about 10,000 centipoise.

38. A process in accordance with claim 6 wherein said polyurethane possesses a weight average molecular weight of from about 2,000 to about 45,000.

39. A process in accordance with claim 7 wherein said number average molecular weight is from about 1,000 to about 30,000.

40. A process in accordance with claim 8 wherein said hydroxyl number is from about 2 to about 150 mg KOH/g.

41. A process in accordance with claim 13 wherein from about 65 to about 90 weight percent of a polyester polyol is selected, from about 5 to about 30 weight percent of a polyisocyanate, and from about 3 to about 10 weight percent of said acid component.

* * * * *